UNITED STATES PATENT OFFICE.

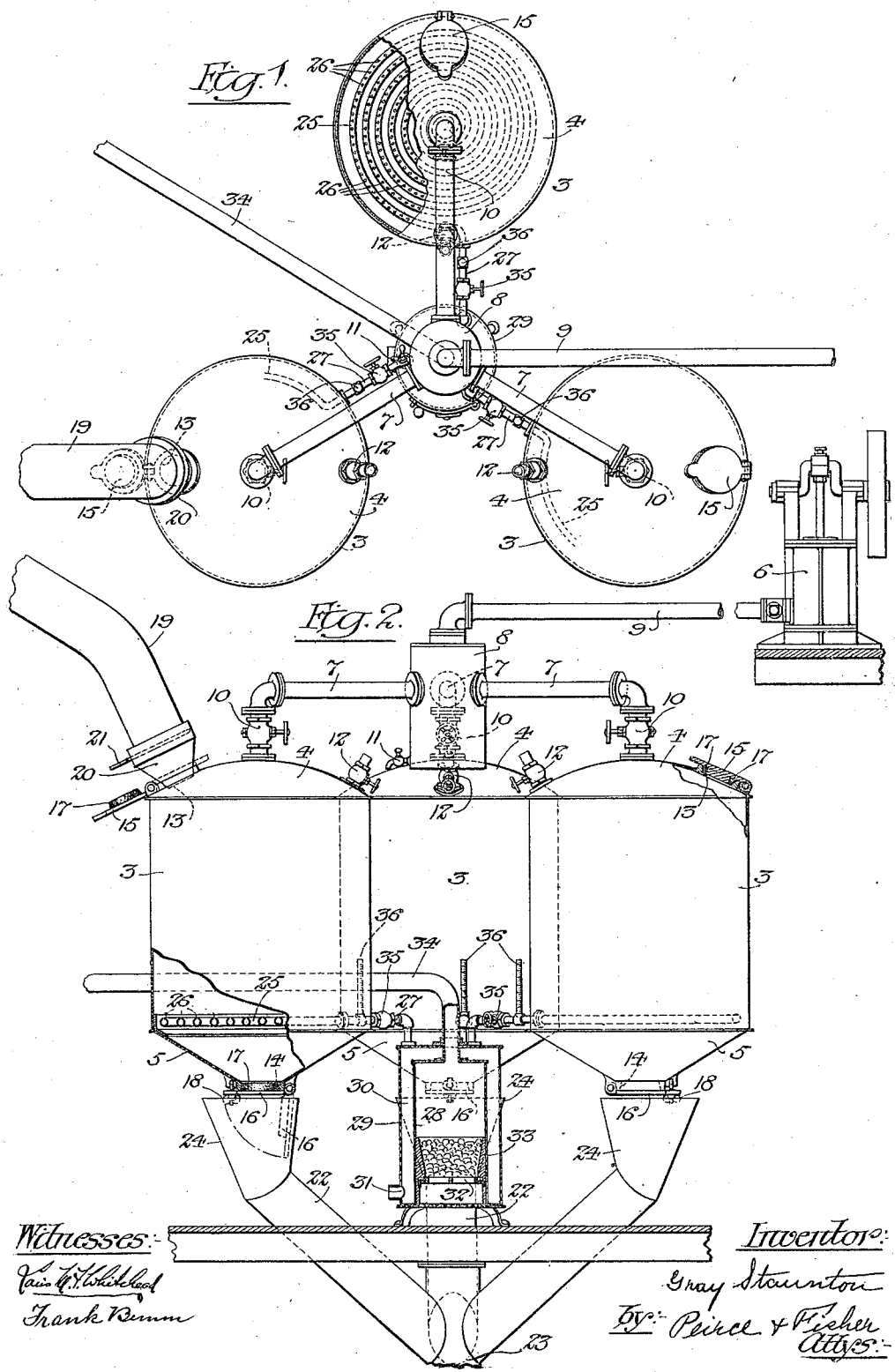

GRAY STAUNTON, OF CHICAGO, ILLINOIS, ASSIGNOR TO WILLIAM S. POTWIN, OF CHICAGO, ILLINOIS.

APPARATUS FOR DRYING GRAIN.

987,837. Specification of Letters Patent. Patented Mar. 28, 1911.

Application filed April 13, 1908, Serial No. 426,723. Renewed August 26, 1910. Serial No. 579,156.

*To all whom it may concern:*

Be it known that I, GRAY STAUNTON, a citizen of the United States, and a resident of Chicago, in the county of Cook and State of Illinois, have invented a certain new and useful Apparatus for Drying Grain, of which the following is a specification.

The invention relates to apparatus for drying grain and seeks to provide an improved apparatus by which grain may be quickly, economically and efficiently dried with a plant of low cost. The apparatus now usually employed for drying grain requires a large amount of heat and expensive plants and, moreover, tend to shrivel the grain.

In accordance with the present improvements the grain is dried in hermetically sealed vessels in which a high vacuum is maintained and the grain is heated by passing a limited amount of heated air through all portions of the grain within the vacuum tank or vessel. A suitable vacuum apparatus or pump connected to the vessel draws the air and evolved moisture therefrom and maintains a high vacuum, so that the moisture is easily and quickly carried away from the grain with the expenditure of a small amount of heat, and so that the grain kernels are expanded and not shriveled by the process.

The improved apparatus will act efficiently and economically and is such that it may be constructed at low cost, when compared with the plants at present required.

In the drawings, Figure 1 is a plan view of the improved apparatus with a portion of one of the vessels or vacuum tanks broken away. Fig. 2 is a view in elevation of the improved apparatus with the air heater and portions of the vessels shown in section.

The vacuum tank or vessel 3 is preferably of upright, cylindrical form, having conical upper and lower ends 4 and 5, all suitably constructed of boiler iron. A number of these vessels or vacuum tanks are preferably employed and are arranged in symmetrical series about a central point as illustrated in the drawings, in which three of these vessels are shown. A vacuum pump 6 or other suitable apparatus for maintaining a vacuum within the tanks or vessels 3 is connected to the upper end of the latter, preferably by means of a series of pipes 7 which lead from the upper portions of the dome-shaped tops 4 of the vacuum tanks to a central, upright, cylindrical condenser or trap 8. A common pipe 9 leads from the top of the condenser or trap to the vacuum pump. Each of the pipes 7 is provided with a cut-off valve 10, so that any one of the vessels or vacuum tanks may be cut off from the vacuum apparatus. The pipes 7 lead into the upper portion of the condenser or trap 8 and the latter is provided at its lower end with a cock 11, so that water collected therein may be drawn off. Each of the vessels is also provided with a vent valve 12 at its upper end so that the vacuum therein may be relieved when the vessel is filled and emptied. Each of the vacuum tanks or vessels is provided with a port or ports for admission and discharge of grain, and, preferably, with an inlet port 13 in the side of the top portion 4 and with a discharge port 14 at the lower, central portion of the conical or hopper bottom 5. These ports are hermetically sealed, during the drying operation, by hinged covers 15 and 16 which are provided with packing rings or gaskets 17 of soft rubber, which are preferably conical in form and snugly fit within the ports, the walls of which are also slightly conical. The vacuum within the tank will serve to draw the covers 15 and 16 snugly to place so that there can be no leaking through the ports during the operation of drying the grain, and so that it is not necessary to fasten the covers in position during the drying operation. In order, however, to hold the covers 16 of the discharge ports 14 in place while the tanks or receptacles are being filled, these covers are preferably provided with fastening devices 18.

The grain is fed into the vacuum tanks or vessels through inlet ports 13 in any suitable manner, as, for example, by means of a charging pipe 19 which leads from a storage bin above the drying apparatus and which, if desired, may be mounted to swing into position over the ports 13. This charging pipe is provided with a hopper-like end 20 adapted to extend within the inlet port 13 and having a cut-off slide 21 for controlling the flow of grain through the pipe. In the form shown, the grain is discharged from the vessels into a series of pipes 22, all leading to a common pipe 23 and having hoppers 24 at their upper ends, arranged below the discharge ports 14 of the drying vessels.

The grain under vacuum in the tanks or vessels 3 is heated to drive off the moisture preferably by passing a slight amount of heated air through all portions of the charge contained in the vessels. For this purpose, a perforated distributer for the heated air is arranged in the bottom of each of the vessels 3. These distributers are preferably in the form of flat, horizontal coils 25, with small perforations 26 in the upper side of the coil. These coils are connected by a series of pipes 27 to a suitable air heater or salamander. In the form shown, the air heater or salamander comprises inner and outer cylinders 28 and 29 having closed ends and separated to form an annular space 30 within which the air is heated and from the upper end of which the pipes 27 lead. A port 31 opens into the lower end of the air space 30. A suitable grate 32 and firepot 33 are arranged within the inner cylinder 28 and a smoke pipe 34 leads from the upper end thereof. Each of the pipes 27 is provided with a regulating valve 35 and with a thermometer 36.

In operating the apparatus, the tanks or vessels 3 are filled with grain and the ports 13 and 14 closed by the covers 15 and 16. The pump 6 is operated to maintain a vacuum of about 27 to 28 inches of mercury within the vessels and the valves 35 and the pipes 27 are adjusted to admit a slight amount of air to the distributing coils 25 of the proper temperature. The amount of air admitted is a small proportion of the capacity of the vacuum pump, so that the latter constantly maintains the vacuum within the vessels and draws off the air and the moisture evolved from the grain through the pipes 7, condenser 8 and pipe 9. The perforated coils 25 effect a distribution of the hot air throughout all portions of the grain so that the body or charge of grain within the vessels is quickly and uniformly heated throughout. The vacuum maintained causes the kernels of grain to expand and also causes the moisture to be driven off at very low temperature, so that only a very small amount of heat is required to properly and quickly dry the grain.

When the grain in one of the vessels has been treated for the proper length of time, this vessel is cut off from the pump and from the air heater by closing the valves 10 and 35 in the corresponding pipes 7 and 27. The vacuum within the vessel is destroyed by opening the vent valve 25. The covers 15 and 16 for the inlet and discharge ports are then opened and the dried grain passed out through the discharge port 14 to the pipe 22. The cover 16 for the discharge port 14 is then closed and the vessel again filled with grain through the inlet port 13. The cover 15 is then closed and the valves 10 and 35 again opened to subject the grain to the action of the vacuum and the heated air. By having a series of vacuum tanks or vessels, the operation may be continuous. In the form shown, for example, which has three tanks, two may be constantly employed in the drying operation, while the other is being emptied and again filled with grain.

It is obvious that the details set forth may be varied without departure from the essentials of the invention.

Having described my invention, what I claim as new and desire to secure by Letters Patent, is:—

1. An apparatus for drying grain comprising an upright, air tight vessel having grain inlet and outlet ports at its upper and lower ends respectively and covers for hermetically sealing said ports, an air heater, a perforated coil in the lower end of said vessel, a pipe connection between said heater and said coil, a throttle valve in said connection and a vacuum pump connected to the upper end of said vessel.

2. An apparatus for drying grain comprising an upright, air tight vessel having grain inlet and outlet ports at its upper and lower ends respectively and covers for hermetically sealing said ports, an air heater, a pipe connection between said heater and the lower end of said vessel to admit a limited amount of heated air thereto, a vacuum pump, a pipe connection between the upper end of said vessel and said pump, a valve in said connection and a vent valve connected to the upper end of said vessel.

3. An apparatus for drying grain comprising an upright, air tight vessel having grain inlet and outlet ports at its upper and lower ends respectively and covers for hermetically sealing said ports, an air heater, a perforated distributer in the lower end of said vessel, a pipe connection between said air heater and said distributer, a valve in said pipe connection, a vacuum pump, a pipe connection between the upper end of said vessel and said pump, a valve in said connection, and a vent valve connected to the upper end of said vessel.

4. An apparatus for drying grain comprising an upright, air tight vessel having grain inlet and outlet ports at its upper and lower ends respectively and covers for hermetically sealing said ports, an air heater, a perforated distributer in the lower end of said vessel, a pipe connection between said air heater and said distributer, a vacuum pump, a pipe connection between the upper end of said vessel and said pump and a condenser interposed in said pipe connection.

5. An apparatus for drying grain comprising a series of upright, air-tight vessels having grain inlet and outlet ports at their upper and lower ends respectively, covers for hermetically sealing said ports, perforated distributers in the lower portions of said vessels, an air heater, a vacuum pump, pipes connecting said air heater and said perforated distributers, pipes connecting said vacuum pump and the upper ends of said vessels, controlling valves in all of said pipes and vent valves connected to the upper ends of said vessels.

GRAY STAUNTON.

Witnesses:
CLARA A. NORTON,
KATHARINE GERLACH.